Nov. 30, 1937.  J. DOMERSHAUSEN  2,100,636
CONTAINER
Filed Sept. 4, 1936
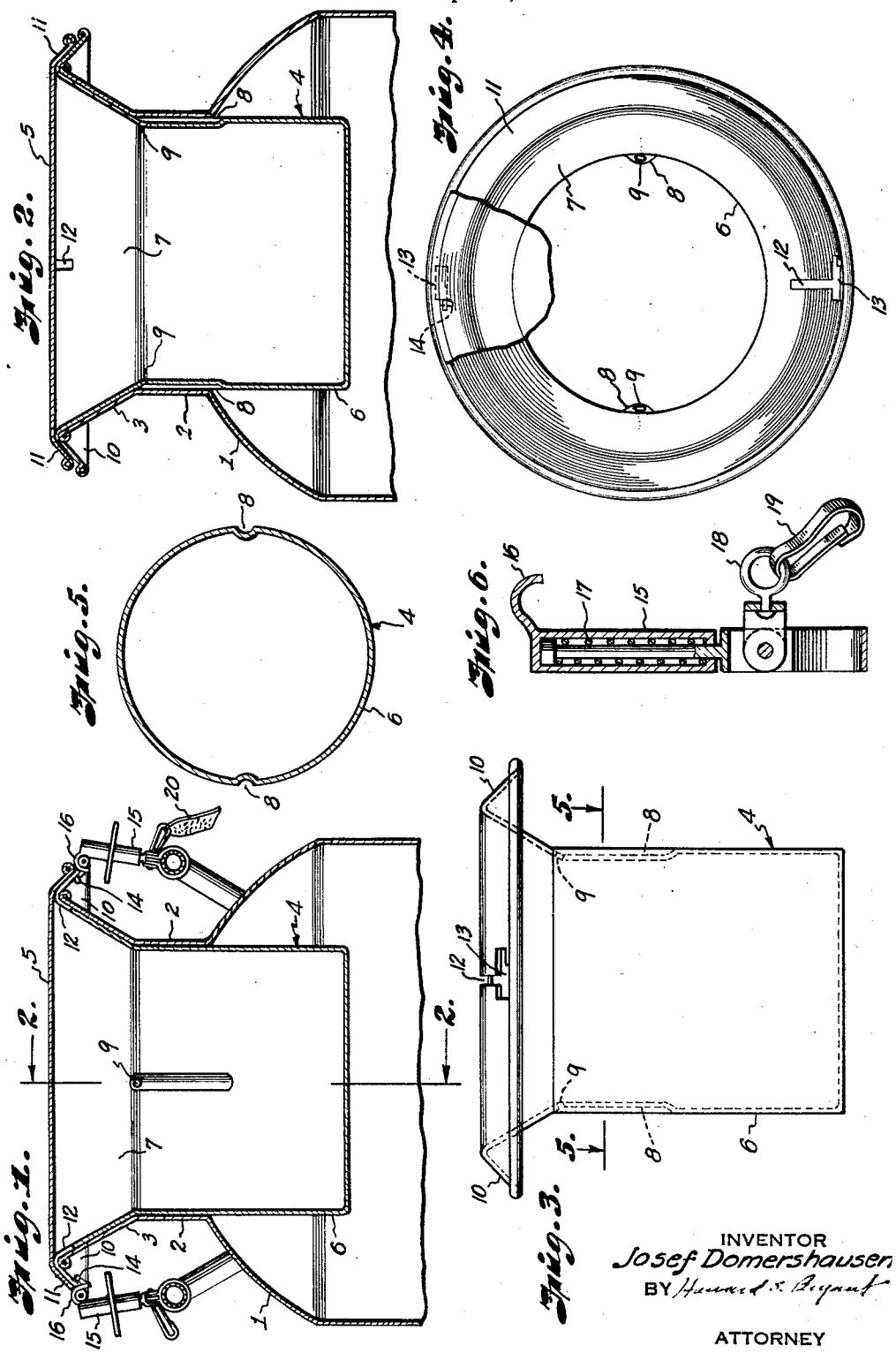
INVENTOR
Josef Domershausen
BY Howard S. Bryant
ATTORNEY Patented Nov. 30, 1937

2,100,636

UNITED STATES PATENT OFFICE 2,100,636

CONTAINER

Josef Domershausen, Kansas City, Mo.

Application September 4, 1936, Serial No. 99,394

1 Claim. (Cl. 220—55)

This invention relates to containers, and is concerned more particularly with containers for the storage and shipment of fermentable and volatile liquids and other materials.

In the storage and shipment of cream, for example, wasteful and unsanitary conditions prevail nowadays due to the unsatisfactory character of present-day containers. These containers permit sour cream to escape due to the excessive gas pressure developed in the containers by fermentation. The pressure is allowed to become so great as oftentimes to drive the cover from the can with considerable violence, endangering persons and property.

Current can constructions are also notorious time consumers due to the fact that the covers and shipping tags are wired to the cans. Moreover, once the cover becomes loose, it remains loose until personally attended to.

It is to overcome the foregoing and other objectionable features of containers for cream and other materials that the present invention has been designed.

It is an object of the invention to provide a container affording adequate escape of gas of fermentation or volatilization.

Another object resides in the provision against turbulence of the contained liquid notwithstanding jogging of the container in shipment and handling.

A further object is to provide a cover including a receptacle adapted to admit liquid, forced upward as by expansion or fermentation, at a restricted rate of flow to preclude turbulence and leakage.

The invention also aims to provide a readily releasable spring latch construction to hold the cover in place.

It is also an object of the invention to provide for quick attachment and release of a shipping tag or the like.

In accordance with the general features of the invention, the container cover comprises a closure in the form of a receptacle fitted in the neck of the container body and cooperating with the neck to provide restricted access of the cream or the like from the container body to the receptacle. Gas of fermentation of the cream also enters the receptacle by the same means of access. The receptacle is covered by a lid and affords restricted escape of the gas from the receptacle to the atmosphere. Readily applicable and releasable spring latch or equivalent means hold down the receptacle and lid.

Simple snap fastener means is employed for expeditious securement and release of the shipping tag.

Further objects and advantages of the invention will appear as the description proceeds.

The invention will be readily understood upon reference to the accompanying description and to the drawing, in which:

Fig. 1 is a section through the upper part of a container construction embodying the invention;

Fig. 2 is a sectional view taken substantially as indicated by the line 2—2 in Fig. 1;

Fig. 3 is a side elevation of the cover receptacle of Fig. 1;

Fig. 4 is a top plan view of the receptacle;

Fig. 5 is a sectional view taken substantially as indicated by the line 5—5 of Fig. 3; and Fig. 6 is an enlarged section-elevation showing details of the latch and tag-attaching structure of the invention.

In the preceding and ensuing description, reference is made to containers for cream. This is done for exemplary purposes and for convenience only, since it is manifest that the invention is of general application.

Referring now more particularly to the drawing, there is shown the upper part of a container body having a main portion 1, a cylindrical neck 2 and a flared mouth 3 beaded to provide a smooth edge.

The cover structure provided for the body in accordance with the illustrated embodiment of the invention comprises a receptacle 4 and a cap or lid 5. The receptacle has a cylindrical portion 6 adapted to have a fluid-tight fit with the neck 2, and also has a flared mouth 7 adapted to have a fluid-tight fit with the mouth 3 of the container body. The receptacle projects down into the main portion and is of substantial volume. To permit restricted flow of liquid and gas from the main portion 1 of the body, the receptacle 4 is formed with one or more elongated depressions 8 communicating with the main portion of the body and terminating upwardly adjacent the upper part of the neck 2, where a hole 9 is provided in the depression to establish communication with the interior of the receptacle.

The receptacle 4 has at its mouth an outwardly and downwardly flared flange 10 with which a complementally shaped flange 11 on the lid 5 is adapted to have a fluid-tight fit. To allow for escape of gas from the receptacle 4 to the atmosphere, the flange 10 is provided with one or more openings 12 between juxtaposed portions of the container mouth 3 and lid 5.

The lid 5 is firmly secured in accordance with this invention in such a manner as to be attachable and releasable with a minimum of time and effort. To this end the receptacle flange 10 is formed with openings 13 conveniently constituting lateral extensions of the openings 12, providing bayonet slots. For cooperation with the bayonet slots, the lid 5 has lugs 14 projecting downwardly from the lid flange 11. The lid or top is applied by placing it over the receptacle with the lugs aligned with the openings 12, lowering the lid until it rests on the receptacle and then turning the lid in the direction to position the lugs in the openings 13 and farthest from the openings 12. It will be observed that the lugs 14 are hook-shaped so as to hook onto the receptacle flange 10 as clearly shown in Fig. 1, thereby preventing removal of the lid except upon turning thereof.

The lugs 14, when applied as explained above, leave spaces in the openings 13 for the reception of locking clamp devices. In the illustrated embodiment of the invention, the locking device employed in conjunction with each lug comprises a latch body 15 having a hook 16 adapted to be manipulated into the aforesaid space and to fill the space sufficiently to prevent removal of the lid. The latch body is urged downwardly by a spring 17 and is preferably swingably anchored to a handle secured to the container body. The spring serves not only to maintain the bayonet connection locked, but also to yieldably but firmly press the receptacle down into fluid-tight engagement with the container body. Thus communication between the main body portion 1 and the atmosphere is restricted and is established through the depressions 8, the holes 9 and the openings 12.

It will be appreciated that with this construction the danger of development of excessive gas pressure is obviated, and the restriction of flow of sour cream to merely a trickle prevents its being thrown violently against the lid. Thus leakage of the liquid and concomitant evils are avoided. The readiness with which the lid and receptacle may be applied and removed is also a contributing factor in favor of this construction.

Upon completion of a journey, the receptacle will contain substantially the entire quantity of sour cream produced in the container, and upon removal of the receptacle any sour cream remaining may be removed quickly. The receptacle is preferably adapted to project into the container body to such an extent as to substantially reduce the free surface area of the contained liquid and serve as a baffle and minimize turbulence within itself and the body.

For the purpose of providing quick attachment and removal of a tag such as a shipping tag, an anchor ring 18 is swiveled or otherwise suitably secured in a convenient location, as at one or more of the latches, and detachably or otherwise linked thereto is a snap fastener such as the loop 19. A tag 20, provided with a hole, is sprung into linked relation to the loop 19 as shown in Fig. 1, where it is securely held against accidental loss and yet is intentionally releasable by merely spreading the ends of the loop and withdrawing the tag. The swivel connection enables the tag to be turned to facilitate its inspection.

In compliance with the requirements of the patent statutes I have here shown and described a preferred embodiment of my invention. It is, however, to be understood that the invention is not limited to the apparatus here shown, the same being merely illustrative of the principles of the invention. What I consider new and desire to secure by Letters Patent is:

A shipping container for cream and the like, comprising a body, a cover receptacle projecting down into the body to such an extent as to substantially reduce the free surface area of the contained cream, said receptacle having an opening at a point above the center thereof and above the normal level of the cream and communicating with the interior of the container to afford restricted access of products of fermentation to the interior of the receptacle, the cover receptacle being closed below said opening to constitute a catch receptacle for non-gaseous products entering therein through said opening and being vented to permit escape of gaseous products, and means for maintaining the body and cover receptacle in assembly.

JOSEF DOMERSHAUSEN.